Nov. 10, 1964  K. W. EDMARK, JR  3,156,237
APPARATUS FOR MEASURING BLOOD PRESSURE AND HEARTBEAT PULSES
Filed March 8, 1963  2 Sheets-Sheet 1

INVENTOR.
KARL W. EDMARK, JR.
BY Herman L. Gordon
ATTORNEY

INVENTOR.
KARL W. EDMARK, JR.
BY Herman L Gordon
ATTORNEY

United States Patent Office 3,156,237
Patented Nov. 10, 1964

3,156,237
APPARATUS FOR MEASURING BLOOD PRESSURE
AND HEARTBEAT PULSES
Karl W. Edmark, Jr., Seattle, Wash., assignor to Physio-Control Company, Inc., Seattle, Wash., a corporation of Delaware
Filed Mar. 8, 1963, Ser. No. 263,932
15 Claims. (Cl. 128—2.05)

This invention relates to apparatus for sensing, monitoring and indicating blood pressure and heartbeat pulses, and more particularly to an apparatus of this type including a device for receiving an extremity such as a finger, toe, earlobe, or the like, and for uniformly compressing same while maintaining a pair of spaced electrodes in conductive contact therewith.

A main object of the invention is to provide an improved blood pressure and heartbeat pulse measuring device employing a pneumatic compressor for receiving a finger, toe, earlobe, or other extremity, the compressor being adapted to fit over the extremity and to be inflated for long periods of time without producing pain, swelling, or edema of the extremity.

A further object of the invention is to provide an improved pneumatic compressor device for receiving an extremity such as a finger, toe, or the like, for sensing, monitoring and indicating blood pressure and heartbeat pulses, said device acting to uniformly compress the entire extremity from its tip to its proximal portion, being arranged so that it may be tolerated for periods of hours without producing swelling of the extremity from increased vascular pressure, and being arranged so that increased pneumatic pressure therein does not cause progressive extrusion of the extremity from the device.

A still further object of the invention is to provide an improved pneumatic compressor device for receiving a finger, toe, or other extremity for the purose of measuring blood pressure and heartbeat pulses, said device being arranged to permit pressure equalization with atmospheric pressure at the distal end of its enclosure while holding the extremity within the enclosure without causing extrusion thereof, and being arranged to apply pneumatic pressure at the tip of the extremity as well as along its length.

Further objects and advantages of the invention will become apparent from the following description and claims, and from the accompanying drawings, wherein:

Figure 1:
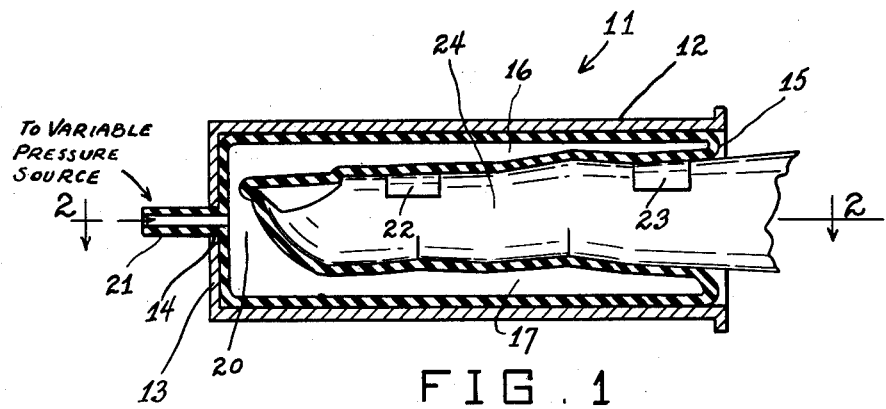
FIGURE 1 is a longitudinal vertical cross-sectional view taken through an improved pneumatic compressor device according to the present invention, shown with a finger received therein in position for sensing, monitoring and recording or indicating blood pressure and heartbeat pulses.

Referring to the drawings, 11 generally designates an improved digital compressor constructed in accordance with the present invention. The device 11 comprises an elongated rigid container 12 open at one end and having a transverse wall 13 at its other end provided with a central aperture 14. Secured in the container 12 is an inflatable bag or vessel 15 of rubber or similar elastic material, comprising the opposing longitudinally extending lumens or lobes 16, 17 of generally arcuate cross-sectional shape, separated at their longitudinal edges by spaces 18 and 19, and connected adjacent the end wall 13 by the transverse joining portion 20, which is provided with the externally projecting conduit portion 21 extending through the aperture 14 and which is adapted to be connected to a suitable variable pneumatic pressure source.

A pair of spaced arcuate transversely extending electrodes 22, 23 are secured to the inner face of the lobe 16 in positions to engage the top surface of a patient's finger 24 inserted between the lobes 16, 17 in the manner illustrated in FIGURE 1, wherein the tip of the finger is closely engaged by the inner wall of the connecting portion 20. Respective insulated flexible conductors 25 and 26 are connected to the electrodes 22 and 23 and extend out through the open end of the rigid container 12 for connection to the electrical portion of the apparatus.

As will be presently explained, the spaced electrodes 22 and 23 are connected to a suitable electrical detection circuit which measures resistance changes between the electrodes in a manner to produce electrical pulse signals corresponding to such a changing resistance. The conduit portion 21 is connected to a source of fluid pressure, such as a container of Freon under pressure, through electrically operated valve means controlled by said electrical detection circuit in a manner to allow the fluid pressure in the chamber 15 to decrease to a predetermined low limit in the absence of a pulse signal. Blood has a specific electrical conductivity less than other body tissue, and when a heartbeat pulse wave flows into the extremity, dilating the arteries, arterioles and capillaries thereof, the resistance between the electrodes 22, 23 decreases sufficiently to produce a pulse signal. This signal causes the valve means to operate in a manner to open slightly and increase the pressure in the chamber 15 sufficiently to reduce the amplitude of further signal pulses from the extremity, as will be presently described.

Figure 4:
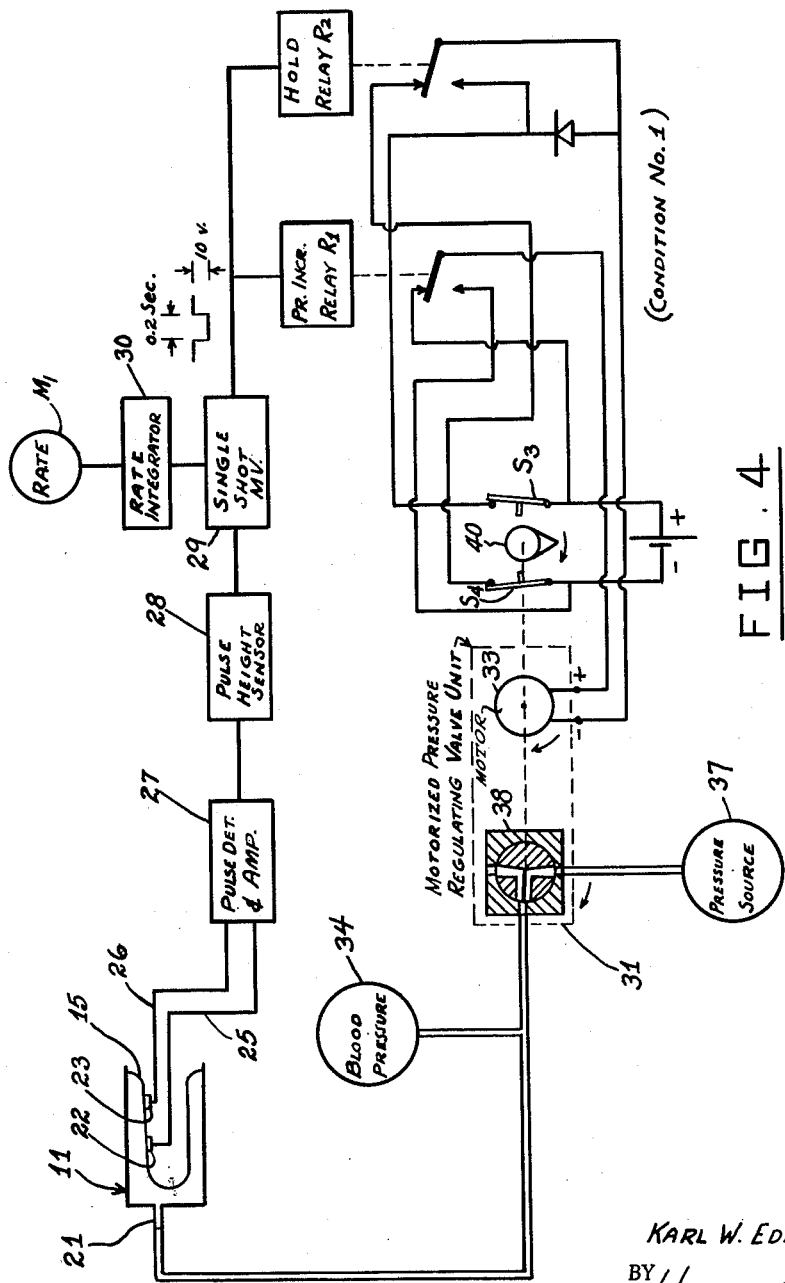
FIGURE 4 is a block diagram showing an improved blood pressure and pulse rate monitoring system employing a compressor device, in accordance with the present invention.

FIGURE 4 diagrammatically illustrates a system employing the digital compressor 11, which utilizes a pneumatic feed-back principle. The digital pulse, as a signal corresponding to changing resistance, is amplified by a pulse detector and amplifier 27 to a point where it will trigger a pulse height sensor 28, which in turn triggers a single-shot multivibrator 29, producing a 0.2 second pulse. This 0.2 second pulse in turn has three action: (1) it energizes a relay $R_1$ for the duration of the negative-going multivibrator pulse; (2) it energizes a relay $R_2$ through a relay hold circuit for a minimum of 2.5 seconds; and (3) it is directly integrated through an integrating circuit 30 to give the pulse rate on a meter $M_1$ in beats per minute. The rate integrator 30 has a time constant of 6 to 10 seconds.

A small reverse-biasing voltage is maintained on the D.C. motor 33 operating the regulator valve 38 of a motorized pressure-regulating valve assembly 31, and in the absence of any multivibrator output, this biasing voltage operates to gradually close the valve pressure fluid supply passage and simultaneously vent the chamber 15, decreasing the digital compressor pressure until the low pressure limit switch $S_3$ opens, stopping the reverse rotation of the valve positioning motor 33. At some point a pulse from the multivibrator will come through and the pressure regulator valve will be opened slightly to admit pressure fluid, increasing the pressure in the chamber 15 and reducing the amplitude of further pulses from the digit.

The system has four conditions, and with these conditions and the absence or presence of pulse output from the pulse-height sensor 28, the system switches automatically into any one of three of the four possible condition modes, and in so doing automatically measures the blood pressure. The following table gives the condition modalities of the system:

| Condition | Digital Pulses | Hold Relay R₂ | Function |
|---|---|---|---|
| No. 1 | Sensed | Energized | Increases digital compressor pressure. |
| No. 2 | Not sensed | ___do___ | Holds digital compressor pressure for 2.5 seconds. |
| No. 3 | ___do___ | Deenergized | Decreases digital compressor pressure. |
| No. 4 | ___do___ | ___do___ | Initial stable condition; switch S₃ open. |

It will be noted that the initial condition No. 4 differs from condition No. 3 only in that in the former the low-limit switch $S_3$ is open.

During operation, the blood pressure is noted on a gauge 34 and recorded in condition No. 2. At any instant that the blood pressure increases, the first pulse automatically switches the instrument into condition No. 1. Between each pulse, condition No. 2 is automatically returned to. The absence of a pulse for 2.5 seconds and/or a heatr rate below 24 beats per minute switches the instrument into condition No. 3, where it remains until the first pulse at the lower blood pressure returns it to condition No. 1. While measuring the blood pressure, the operation mode is 3—1—2 while scanning for a lower pressure, and 2—1—2 while scanning for a higher pressure. The instrument continuously and automatically carries out one operation mode or the other and thus is either looking for a higher, or lower, blood pressure. The frequency of the condition switching is determined by the heart or pulse rate of the patient.

The above-mentioned operation modes are summarized by the following table:

Operation (condition sequence):            Function
     3—1—2 _____ Scanning for lower blood pressure, recording pulse rate.
     2—1—2 _____ Scanning for higher blood pressure, recording pulse rates.

The apparatus above described continuously sense monitors and indicates the blood pressure and pulse produced from the beating heart. The detected pulse-derived signals are amplified and control the pressure from the high pressure source, shown at 37. The apparatus, at 2.5 second intervals, permits small amounts of blood to flow into the extremity, maintaining viability. Uniform compression prevents pain or swelling of the extremity. Thus, continuous blood pressure and pulse monitoring can be effected over many hours, or days. While the apparatus is mainly intended for use in the operating room and in the hospital for measuring and indicating or recording blood pressure, it is equally well suited for use on human beings or experimental animals in other locations, such as space suits, human centrifuges, and the like. The apparatus operates by picking up the peripheral pulse from an extremity, such as the ear, finger, or toe of the subject, and continuously monitors for an increasing or decreasing blood pressure. The device operates on the principle of electrical impedance change produced in an extremity resulting when blood flows into the extremity.

The digital compressor device 11 overcomes the disadvantages of conventional arm or leg occluding cuff blood pressure measuring devices in that it is designed to fit over the distal extremity and may be repeatedly inflated for long periods of time without producing pain, swelling or edema of the extremity, as is commonly seen after prolonged, repeated inflation of a conventional constricting or occluding cuff. The compressor device 11 also does not extrude the extremity, as occurs with a compressor which entirely envelopes the extremity.

Figure 2:
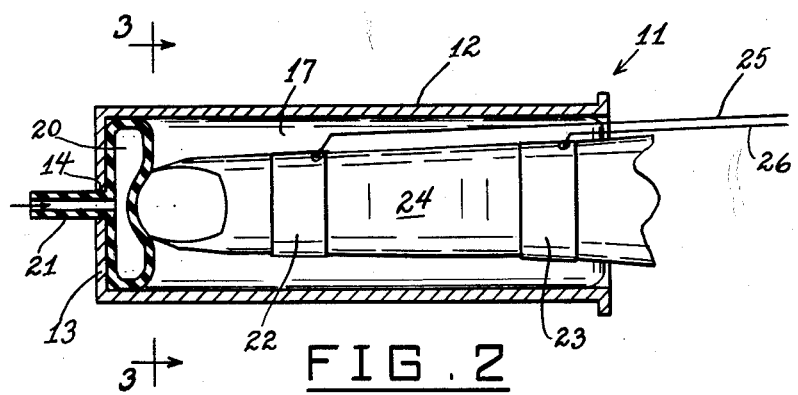
FIGURE 2 is a horizontal cross-sectional view taken substantially on the line 2—2 of FIGURE 1.
Figure 3:
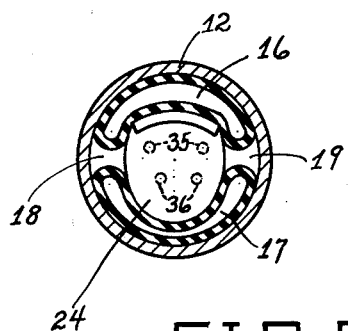
FIGURE 3 is a transverse vertical cross-sectional view taken substantially on the line 3—3 of FIGURE 2.

From FIGURES 1, 2 and 3 it will be seen that the partially enclosing extremity compressor 11 has at least two very important advantages: (1) it uniformly compresses the entire digit from the tip to the proximal portion of the digit; this uniform compression may be tolerated for periods of hours without producing swelling of the extremity from increased vascular pressure, in distinction to the swelling seen distal to the site of conventional occluding cuffs; (2) increased pressure within the double-lumen partially enveloping elastic extremity compressor chamber 15 does not cause progressive extrusion of the finger from the enclosure, as would occur with a completely enveloping extremity compressor. It will be seen from FIGURES 1, 2 and 3 that with increasing pressure in the chamber 15, the chamber compresses the finger 24 from top to bottom, applying pressure over the four vessels of the digit, consisting of the two dorsal digital arteries 35, 35 and the two anterior digital arteries 36, 36 of the toe or finger.

In the case where a compressor device 11 is employed on an ear lobe, the problem of extrusion does not arise, since pressure is applied from one side of the lobe to the other.

FIGURES 2 and 3 show that the finger is not completely enclosed by the digital compressor, as would be the case with an occluding cuff. This permits pressure equalization with the atmosphere in the spaces 18 and 19, and equalization with the atmospheric pressure occurs at the distal end of the enclosing extremity compressor. Thus, the finger is held within the enclosure and is not extruded, as would be the case if the compressing element completely circumscribed the digit in a long-cuff manner. The thrust of the small but important pressure applied to the finger tip by the inner wall of chamber portion 20 is counteracted by the friction provided at the inner walls of the chamber portions 16 and 17.

A cam 40 driven by motor 33 operates the low pressure limit switch $S_3$ and the high pressure limit switch $S_4$.

The regulating valve assembly 31 may be similar to Model No. 11–018–002, manufactured by C. A. Norgren Company, 3401 South Elati Street, Englewood, Colorado.

While a specific embodiment of an improved apparatus for sensing, monitoring and indicating blood pressure and heart beat pulses has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a blood pressure and heartbeat pulse measuring apparatus, an extremity-receiving pneumatic compressor provided on its interior surface with spaced electrodes located to make electrical contact with two spaced points on an extremity received within the compressor, means to supply fluid under pressure to said compressor, pressure-indicating means connected to said compressor, impedance-responsive means electrically connected to said electrodes so that the impedance defined by the portion of the extremity between said two spaced points will be electrically connected to said impedance-responsive means, said impedance varying with the flow of blood through said portion, and means varying the fluid pressure in said compressor in accordance with the response of said impedance-responsive means.

2. In a blood pressure and heartbeat pulse measuring apparatus, an extremity-receiving pneumatic compressor provided on its interior surface with spaced electrodes located to make electrical contact with two spaced points on an extremity received within the compressor, a fluid pressure source, conduit means including a pressure-regulating valve connecting said source to said compressor, impedance-responsive means electrically connected to said electrodes so that the impedance defined by the portion of the extremity between said two spaced points will be electrically connected to said impedance-responsive means, said impedance varying with the flow of blood through said portion, and means to adjust said pressure-regulating valve in accordance with the response of said impedance-responsive means.

3. In a blood pressure and heartbeat pulse measuring apparatus, an extremity-receiving pneumatic compressor provided on its interior surface with a pair of spaced electrodes located to make electrical contact with two spaced points on an extremity received within the compressor, means to supply fluid under pressure to said compressor, impedance-responsive means electrically connected to said electrodes so that the impedance defined by the portion of the extremity between said two spaced points will be electrically connected to said impedance-responsive means, said impedance varying with the flow of blood through said portion to generate electrical signals corresponding to heart beat pulses, and means to adjust the fluid pressure in said compressor in accordance with said signals.

4. A blood pressure and heartbeat pulse measuring apparatus comprising an extremity-receiving pneumatic compressor provided on its interior surface with a pair of spaced electrodes located to make electrical contact with two spaced points on an extremity received within the compressor, a fluid pressure source, conduit means including a pressure-regulating valve connecting said source to said compressor, pressure indicating means connected to said compressor, impedance-responsive means electrically connected to said electrodes so that the impedance defined by the portion of the extremity between said two spaced points will be electrically connected to said impedance-responsive means, said impedance varying with the flow of blood through said portion to generate electrical signals corresponding to heartbeat pulses, means to indicate the frequency of said signals, and means to adjust said pressure-regulating valve in accordance with said signals.

5. A blood pressure measuring apparatus comprising a pneumatic compressor containing fluid under pressure and having an extremity-receiving cavity provided with a pair of spaced electrodes located to make electrical contact with two spaced surface portions of an extremity received in said cavity, pressure-indicating means connected to said compressor, electrical impedance-responsive means connected to said electrodes so that the impedance defined by the portion of the extremity between said two spaced points will be electrically connected to said impedance-responsive means, said impedance varying with the flow of blood through said portion, and means operated by said impedance-responsive means for modulating the pressure of the fluid in the compressor.

6. In a blood pressure measuring apparatus, an extremity-receiving pneumatic compressor comprising a rigid container open at least at one end, an elastic hollow unitary chamber mounted in said container and having an inner surface shaped to substantially surround an extremity and to receive it lengthwise for a substantial portion of its length, the elastic chamber having at least two longitudinally extending internal edges spaced to define a relief channel extending for the length of the received portion of the extremity and communicating with the open end of the container, and conduit means connected to said elastic chamber for admitting fluid under pressure thereto.

7. In a blood pressure measuring apparatus, an extremity-receiving pneumatic compressor comprising a rigid container open at least at one end, an elastic hollow unitary chamber mounted in said container and having an inner surface shaped to substantially surround an extremity and to receive it lengthwise for a substantial portion of its length, the elastic chamber having at least two internal longitudinally extending edges spaced to define a relief channel extending for the length of the received portion of the extremity and communicating with the open end of the container, conduit means connected to said elastic chamber for admitting fluid under pressure thereto, and a pair of spaced electrodes mounted on the inner surface of said chamber in positions to make electrical contact with two spaced portions of an extremity received therein.

8. In a blood pressure measuring apparatus, an extremity-receiving pneumatic compressor comprising an elongated rigid container open at least at one end, an elastic hollow unitary chamber mounted in said container and formed with a plurality of longitudinally extending intercommunicating lobes defining a cavity therebetween adapted to receive an extremity, the longitudinal edges of at least two adjacent lobes being spaced to define a relief channel extending for the length of the received portion of the extremity and communicating with the open end of the container, and conduit means connected to said elastic chamber for admitting fluid under pressure thereto.

9. In a blood pressure measuring apparatus, an extremity-receiving pneumatic compressor comprising an elongated rigid container open at least at one end, an inflatable hollow unitary chamber mounted in said container and having an inner surface shaped to substantially surround an extremity and to receive it lengthwise for a substantial portion of its length, said inflatable chamber being formed to define at least one relief channel located so as to extend for the length of the received portion of the extremity and communicating with the open end of the container, and conduit means connected to said inflatable chamber for admitting fluid under pressure thereto.

10. In a blood pressure measuring apparatus, an extremity-receiving pneumatic compressor comprising an elongated rigid container open at least at one end, an inflatable hollow unitary chamber mounted in said container and shaped to define a cavity adapted to receive an extremity, said inflatable chamber being formed to define at least one relief channel extending a substantial distance longitudinally along the cavity and communicating with the open end of the container, and a pair of spaced electrodes mounted inside said cavity in positions to make electrical contact with two spaced portions of an extremity received therein.

11. In a blood pressure measuring apparatus, an extremity-receiving pneumatic compressor comprising an elongated rigid container open at least at one end, an inflatable hollow unitary chamber mounted in said container and formed with a plurality of intercommunicating lobes extending toward said open end and defining a cavity therebetween adapted to receive an extremity, the longitudinal edges of at least two adjacent lobes being spaced to define a relief channel communicating with the open end of the container, and conduit means connected to said inflatable chamber for admitting fluid under pressure thereto.

12. In a blood pressure measuring apparatus, an extremity-receiving pneumatic compressor comprising a rigid container open at least at one end, an inflatable hollow unitary chamber, mounted in said container and formed with a plurality of intercommunicating longitudinal lobes extending toward said open end and defining a cavity therebetween adapted to receive an extremity, the edges of at least two adjacent lobes being spaced to define a longitudinal relief channel communicating with the open end of the container, conduit means connected to said inflatable chamber for admitting fluid under pressure thereto, a pair of spaced electrodes located at the inside wall surface of one of the lobes and located to make electrical contact with two spaced portions of an extremity received in said cavity, and respective conductors connected to said electrodes and extending out of the rigid container.

13. In a blood pressure measuring apparatus, an extremity-receiving pneumatic compressor comprising a rigid container open at least at one end, an inflatable hollow unitary chamber mounted in said container and formed with a pair of spaced opposing intercommunicating longitudinal lobes extending toward said open end and defining a cavity therebetween adapted to receive an extremity, the adjacent edges of the lobes being spaced from each other to define longitudinal relief channels, and conduit means connected to said inflatable chamber for admitting fluid under pressure thereto.

14. The structure of claim 13, and a pair of transversely extending, longitudinally spaced electrodes secured to the inside wall surface of one of said lobes and located to make electrical contact with two spaced portions of an extremity received in said cavity, said electrodes being provided with conductors electrically connected thereto and extending out of the rigid container.

15. The structure of claim 13, and wherein said inflatable chamber includes a transverse hollow end portion communicatively connecting the lobes and adapted to exert pressure on the tip of an extremity received between the lobes.

References Cited in the file of this patent
UNITED STATES PATENTS

| | | |
|---|---|---|
| 2,139,509 | Marcellus | Dec. 6, 1938 |
| 2,826,191 | Burns | Mar. 11, 1958 |
| 2,875,750 | Boucke | Mar. 3, 1959 |
| 2,944,542 | Barnett | July 12, 1960 |